Patented July 26, 1938

2,124,594

UNITED STATES PATENT OFFICE 2,124,594

DIAZOAMINO COMPOUNDS

Albert Schmelzer, Cologne/Rhineland, Germany, assignor to General Aniline Works, Inc., New York, N. Y., a corporation of Delaware No Drawing. Application July 20, 1937, Serial No. 154,633. In Germany July 25, 1936

5 Claims. (Cl. 260—69)

The present invention relates to volatile base salts of diazoamino compounds.

Diazomamino compounds may be regarded as "stabilized" diazo compounds. They are generally prepared by combining diazo compounds with primary or secondary aromatic amines or with secondary aliphatic or heterocyclic amines and are characterized by their capability of being easily split up into the diazo compound and the amine. This splitting up is generally effected by an acid treatment, for instance, by a steaming with, for instance, formic acid or acetic acid vapours. Of particular importance are those diazoamino compounds which contain solubilizing groups in the radical attached to the amino nitrogen and are free from such groups in the radical attached to the —N=N—, as they are soluble in water and yield on spitting a diazo compound of an aromatic radical which is free from groups inducing solubility in water. Up to the present only such diazoamino compounds have been employed in practice as have the acid groups neutralized by means of alkali metals.

I have now found that volatile base salts of such diazoamino compounds exert new and unexpected properties which make them particularly suitable for the purpose indicated above. These volatile base salts are characterized by their being much more easily split up than the hitherto known alkali metal salts. In consequence thereof, in most cases a mere blowing in of water vapour or steaming of these products is sufficient to effect the splitting up into the diazo compound and the "stabilizer". This is most probably due to the fact that the volatile bases evaporate while hot thus imparting to the remaining preparation an acidity which is sufficient for effecting the spitting up of the same. In consequence thereof, the expensive and troublesome treatment with acid vapours can be dispensed with or at least the quantity of acid vapours can be materially decreased.

My new diazoamino compounds can be prepared generally by dissolving the "stabilizer" in water, adding thereto an excess of ammonium carbonate and then the diazo compound; when working in this manner, the ammonium salt of the diazo amino compound precipitates in most cases. Salts of volatile amines are prepared by dissolving the stabilizer in an aqueous solution of the amine, adding thereto the diazo compound and ammonium carbonate for neutralizing the hydrogen halide; also in these cases the volatile base salt precipitates in most cases. If it is too easily soluble in water it can be isolated by evaporation in the vacuo or by salting out with, for instance, ammonium chloride. Such amines are preferred as have a boiling point between about 30° C. and about 80° C.

The following examples illustrate the invention without, however, restricting it thereto the parts being by weight:—

Example 1

42.5 parts of 4-chloro-2-toluidine are suspended in 250 parts of water and 115 parts of hydrochloric acid and diazotized at a temperature of 10–12° C. with a solution of 20.5 parts of sodium nitrite in 50 parts of water. The diazo solution is filtered and at 0 to +5° C. quickly added to a solution of 80 parts of 4-sulfo-2-aminobenzoic acid in 700 parts of pyridine, which is diluted with 300 parts of water, while thoroughly stirring the mixture. After 4–5 hours' stirring no diazo compound can be traced. Then the mixture is diluted with about 1000 parts of water and salted out with about 500 parts of ammonium chloride. The pyridine salt of the diazo amino compound precipitates in yellow crystals. The product filtered with suction is dried in the open air. This diazoamino compound has probably the following formula:

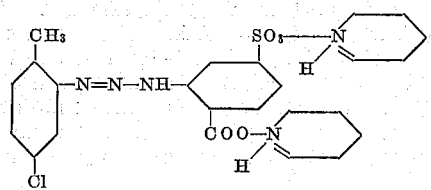

If instead of pyridine, quinoline or quinaldine is used, corresponding salts of the diazoamino compounds are obtained.

Example 2

42.5 parts of 4-chloro-2-toluidine are diazotized as described in Example 1. At a temperature of about —4° C. the filtered diazo solution is added quickly to a solution prepared from 80 parts of 4-sulfo-2-amino-benzoic acid, 140 parts of ammonium carbonate and 800 parts of water while stirring thoroughly. Coupling occurs with the evolution of carbon dioxide. A diazoamino compound probably of the following formula precipitates in yellow crystals:

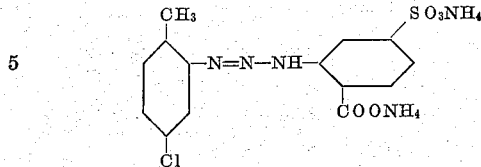

After about 3–4 hours' stirring no more diazo compound is traceable. The mixture is filtered with suction and thoroughly dried.

*Example 3*

If 76 parts of 5-sulfo-3-aminobenzoic acid are used instead of the 4-sulfo-2-aminobenzoic acid a diazoamino compound probably of the following formula is obtained:

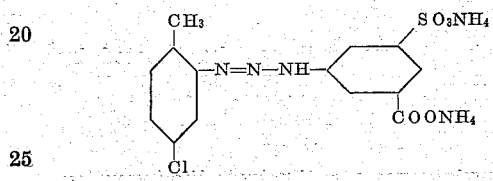

As it does not precipitate from the solution, it is isolated by salting out with about 350 parts of sodium chloride; it shows a yellow coloration.

*Example 4*

When using 115 parts of isobutyl-5-sulfo-2-amino-benzoic acid under the conditions mentioned in Example 2, a diazoamino compound probably of the following formula is obtained:

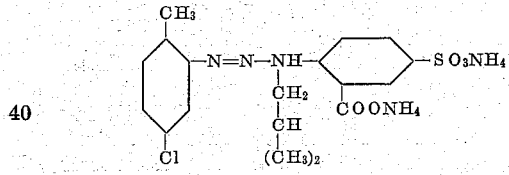

The product crystallizes in yellow crystals. It is worked up as described in Example 2.

*Example 5*

42.5 parts of 4-chloro-2-toluidine are diazotized according to the instructions given in Example 2; the solution is then made slightly acid to Congo red by addition of a solution of 25 parts of ammonium carbonate in 100 parts of water. The filtered diazo-solution is quickly added to a solution containing 58.5 parts of 2-aminoterephthalic acid and 115 parts of ammonium carbonate in 800 parts of water below 0° C. while thoroughly stirring. The diazoamino compound probably of the following formula precipitates in yellow crystals:

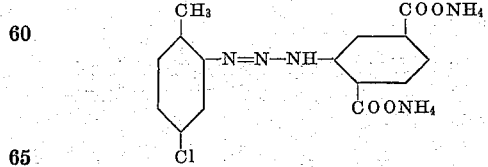

The working up is performed as described above. If the aminoterephthalic acid of the above example is substituted by the aniline-2.5-disulfonic acid, the corresponding diazoamino compound also precipitating from the reaction mixture in yellow crystals is obtained.

*Example 6*

48.6 parts of 2,5-dichloraniline are suspended in a solution of 130 parts of hydrochloric acid in 230 parts of water and diazotized at a temperature of 10–15° C. with 20.5 parts of sodium nitrite, dissolved in 50 parts of water while stirring thoroughly. The diazo solution is neutralized and filtered if necessary; about 25 parts of ammonium carbonate dissolved in 100 parts of water are added thereto. While stirring thoroughly at about −4° C. to 0° C. this solution is added drop by drop to a solution of 80 parts of 4-sulfo-2-aminobenzoic acid in 800 parts of water having admixed therewith 115 parts of ammonium carbonate.

A yellow colored diazoamino compound probably of the following formula:

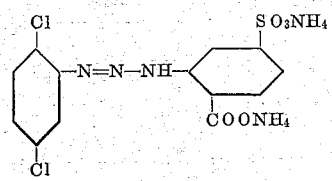

precipitates. As it is rather difficultly soluble in water, it is washed and dried thoroughly after having been filtered with suction.

*Example 7*

48.6 parts of 2,5-dichloraniline are diazotized as described in Example 6 and added drop by drop at 0 to +10° C. to a solution of 80 parts of 4-sulfo-2-aminobenzoic acid in 840 parts of a sodium carbonate solution of 16.5% strength while stirring thoroughly. When diazo compound can no longer be traced, it is salted out with about 200 parts of ammonium-chloride, stirring being continued for 2 hours, and then filtered with suction. The diazoamino compound thus isolated is present at least in part in the form of its ammonium salt.

*Example 8*

According to the directions given in Example 6 2,5-dichloraniline is diazotized whereupon the diazo solution is neutralized. The 4-sulfo-2-aminobenzoic acid is replaced under the same conditions by 72 parts of 5-sulfo-2-aminobenzoic acid. In this case the diazoamino compound is salted out by means of 350 parts of sodium chloride and carefully dried after having been rinsed with a 75% sodium chloride solution.

*Example 9*

46.4 parts of 5-nitro-2-toluidine are added to a solution consisting of 115 parts of hydrochloric acid and 150 parts of water. The amine is then diazotized at 10–12° C. by stirring with 20.5 parts of an aqueous sodium nitrite solution. After neutralizing by means of 125 parts of a 20% ammonium carbonate solution the reaction product is filtered, whereupon the diazo solution is caused to react with a solution of 80 parts of the ammonium salt of 4-sulfo-2-aminobenzoic acid as set forth in Example 6. The diazoamino compound which probably corresponds to the following formula:

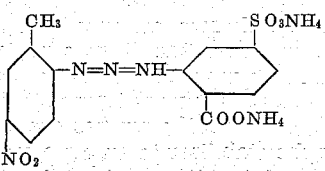

is salted out by means of 300 parts of ammonium chloride; it forms deeply yellow crystals which are filtered with suction and carefully dried.

Example 10

On replacing the 4-sulfo-2-aminobenzoic acid by 5-sulfo-2-aminobenzoic acid there is obtained according to the directions given in Example 9 a diazoamino compound probably of the following formula:

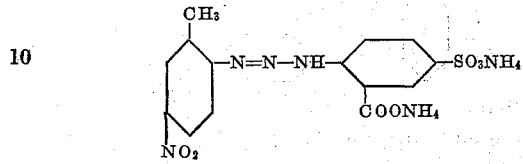

which may also be salted out from the reaction mixture.

Example 11

According to the directions given in Example 5 42.5 parts of 4-chloro-2-toluidine are diazotized. After neutralizing, the diazo solution thus obtained is added while thoroughly stirring below 0° C. to a solution of 75 parts of ammonium carbonate and the diethylamino salt of 4-sulfo-2-amino-benzoic acid (obtained from 80 parts of 4-sulfo-2-aminobenzoic acid and 48 parts of 98.5% diethylamine in 800 parts of water). The diazoamino compound which probably corresponds to the following formula:

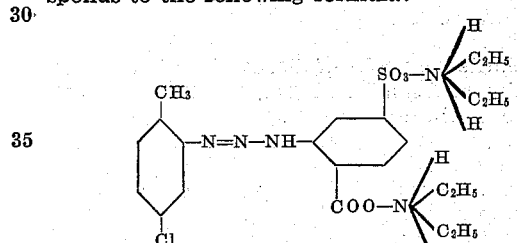

is filtered with suction, rinsed with a 75% saturated sodium chloride solution and carefully dried.

Example 12

On replacing the diethylamine employed in Example 10 by 69 parts of a 95% triethylamine a diazoamino compound probably of the following formula is obtained:

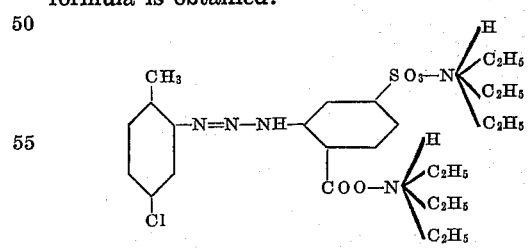

The product separating out is worked up as described in Example 10.

Example 13

111.1 parts of an 80% paste of 2-amino-5-benzoylamino-hydroquinonediethylether are finely suspended in 90 parts of water and 140 parts of raw hydrochloric acid and then diazotized at a temperature of 15–20° C. by means of a solution of 26 parts of sodium nitrite in 65 parts of water. The solution is filtered and at 15° C. added while stirring to a solution of 41.1 parts of sarcosine chlorohydrate and 164 parts of ammonium carbonate in 500 parts of water. When no diazo compound can be traced any more, the precipitated diazoamino compound which probably has the following constitution:

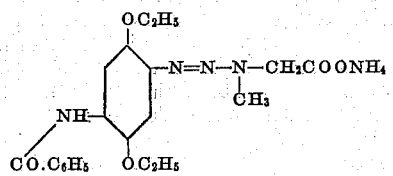

is sucked off and dried. It represents a weakly yellowish powder.

Example 14

59.4 parts of 4-chloro-2-anisidine chlorohydrate are diazotized as described in Example 1. The filtered solution is added into a solution of 80 parts of 4-sulfo-2-amino-benzoic acid and 140 parts of ammonium carbonate in 500 parts of water, below 0° and while stirring. The diazoamino compound which probably has the following constitution:

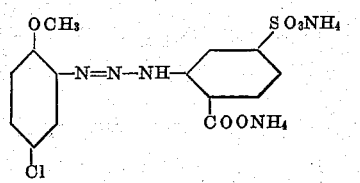

precipitates; it is isolated in the usual manner.

Example 15

The diazo compound of Example 13 is added while stirring at a temperature of 15° C. to a solution of 80 parts of 4-sulfo-2-aminobenzoic acid and 130 parts of ammonium carbonate in 500 parts of water. The reaction being finished the precipitating yellowish ammonium salt of the diazoamino compound is sucked off and dried.

Example 16

When using a mixture of 65.7 parts of 4-toluidine-2-sulfonic acid under the conditions described in Example 2, a diazoamino compound of the following probable constitution is obtained:

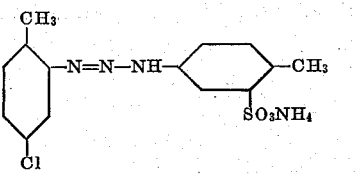

The product precipitates in weakly yellowish crystals.

Example 17

When using a mixture of 44.5 parts of methyltaurine under the conditions of Example 13 the ammonium salt of the diazoamino compound of methyltaurine and 2-amino-5-benzoyl-aminohydroquinone diethylether is obtained in form of a greenish-grey powder.

Example 18

When using 53 parts of methylamino succinic acid under the conditions of Example 13 the diazoamino compound of the following probable formula is obtained:

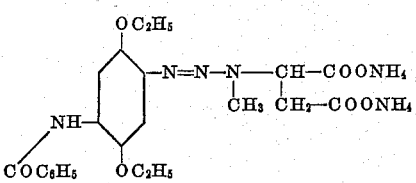

The product shows a yellow coloration.

Example 19

136.2 parts of a 60% paste of 2-amino-5-benzoylamino-hydroquinonedimethyl ether are diazotized and caused to react with 43.5 parts of iminodiacetic acid dissolved in water under the conditions described in Example 13; the following diazoamino compound is obtained:

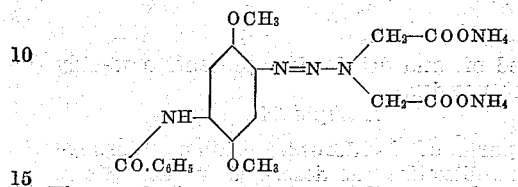

The product represents a yellow powder.

Example 20

95 parts of an 80% paste of 2-amino-5-benzoylamino-4-methyl-1-anisole are caused to react with sarcosine chlorohydrate and ammonium carbonate under the conditions described in Example 13. The following diazoamino compound is obtained:

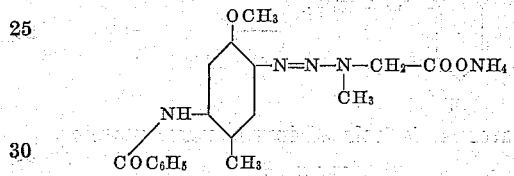

Example 21

When using 78.4 parts of beta-methylamidotetrahydro naphthalene monosulfonic acid under the conditions of Example 13 the following diazoamino compound is obtained:

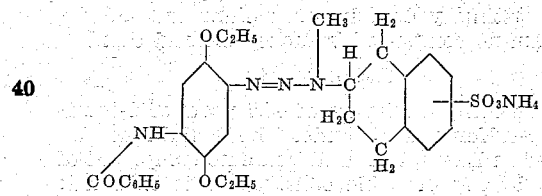

This product shows a brown coloration.

Example 22

When using 69.4 parts of tetrahydroquinoline monosulfonic acid under the conditions of Example 13, the following diazoamino compound is obtained:

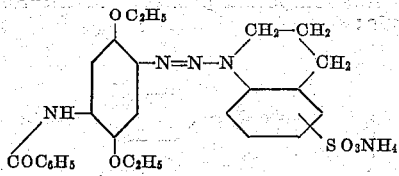

This compound precipitates in form of an orange colored powder.

Example 23

37.2 parts of pyrolidine-alpha-carboxylic acid are used for the preparation of the diazoamino compound under the conditions of Example 13. The following product is obtained:

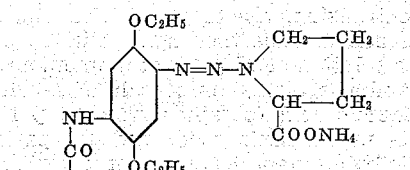

This diazoamino compound precipitates in weakly greyish-colored crystals.

I claim:

1. Volatile base salts of diazoamino compounds containing acid salt forming groups in the radical attached to the amino nitrogen.
2. The products as claimed in claim 1 wherein the volatile bases are alkyl amines of a boiling point between about 30° C. and about 80° C.
3. The products as claimed in claim 1 wherein diethylamine is employed as volatile base.
4. The products as claimed in claim 1 wherein ammonia is employed as volatile base.
5. The products as claimed in claim 1 wherein the volatile base is an alkyl amine.

ALBERT SCHMELZER.